(12) United States Patent
Hardy et al.

(10) Patent No.: US 7,915,338 B2
(45) Date of Patent: Mar. 29, 2011

(54) ADHESIVE WITH ALKANOATE BLEND

(75) Inventors: Cordell M. Hardy, Roseville, MN (US); Kurt C. Melancon, White Bear Lake, MN (US); John W. Frank, Cottage Grove, MN (US); Scott D. Pearson, Woodbury, MN (US)

(73) Assignee: 3M Innovative Properties Company, St.Paul, MN (US)

( * ) Notice: Subject to any disclaimer, the term of this patent is extended or adjusted under 35 U.S.C. 154(b) by 886 days.

(21) Appl. No.: 11/275,347

(22) Filed: Dec. 28, 2005

(65) Prior Publication Data

US 2007/0149669 A1 Jun. 28, 2007

(51) Int. Cl.
C08F 222/40 (2006.01)
C08K 5/00 (2006.01)
C08K 5/04 (2006.01)

(52) U.S. Cl. .................. 524/548; 524/284; 524/394

(58) Field of Classification Search ............ 524/394, 524/507, 548, 284
See application file for complete search history.

(56) References Cited

U.S. PATENT DOCUMENTS

| | | | |
|---|---|---|---|
| 3,576,776 A | | 4/1971 | Muszik et al. |
| 3,787,345 A | * | 1/1974 | Dickman et al. ............ 524/322 |
| 3,964,832 A | * | 6/1976 | Cohen et al. .................. 401/75 |
| 4,716,189 A | * | 12/1987 | Gollub et al. ................ 524/284 |
| 4,746,696 A | | 5/1988 | Gierenz et al. |
| 4,931,282 A | | 6/1990 | Asmus et al. |
| 4,946,301 A | * | 8/1990 | Palm ............................. 401/49 |
| 5,010,120 A | * | 4/1991 | Sugiura ........................ 523/219 |
| 5,225,473 A | | 7/1993 | Duan |
| 5,262,462 A | | 11/1993 | Watanabe |
| 5,284,897 A | | 2/1994 | Columbus et al. |
| 5,306,749 A | | 4/1994 | Columbus et al. |
| 5,371,131 A | | 12/1994 | Gierenz et al. |
| 5,409,977 A | | 4/1995 | Sitaramiah et al. |
| 5,441,562 A | | 8/1995 | Broich et al. |
| 5,567,753 A | | 10/1996 | Shuman et al. |
| 6,066,689 A | * | 5/2000 | Columbus et al. ............ 524/322 |
| 6,123,933 A | | 9/2000 | Hayama et al. |
| 6,417,261 B1 | * | 7/2002 | Maier et al. .................. 524/394 |
| 6,590,051 B1 | | 7/2003 | Carter et al. |
| 6,734,233 B2 | | 5/2004 | Yazawa et al. |
| 2004/0247655 A1 | | 12/2004 | Asmus et al. |
| 2004/0266929 A1 | | 12/2004 | Imai et al. |

FOREIGN PATENT DOCUMENTS

| | | |
|---|---|---|
| JP | 4-161475 | 6/1992 |
| JP | 2748024 | 5/1998 |
| WO | WO 00/06659 | 2/2000 |

OTHER PUBLICATIONS

STN Search Report pp. 1-2.*
Richard J. Lewis, Sr. "Hawley's Condensed Chemical Dictionary, 12th Edition", John Wiley & Sons, Inc., New York pp. 107701078 (1993).*
D-sorbitol pp. 1-6 (http://www.chemicalbook.com/ProductMSDSDetailCB7183649_EN.htm).*
1,1,1-trimethylolpropane pp. 1-3 (http://www.inchem.org/documents/icsc/icsc/eics0366.htm).*
Richard J. Lewis, Sr. "Hawley's Condensed Chemical Dictionary, 12th Edition", John Wiley & Sons, Inc., New York pp. 566 (1993).*
"Solvent-Induced Crystal Morphology Transformation in a Ternary Soap System: Sodium Stearate Crystalline Fibers and Platelets", Liang, et al., Langmuir (2001) 17, pp. 6447-6454.
"Solvent Modulated Polymorphism of Sodium Stearate Crystals Studied by X-Ray Diffraction, Solid-State NMR, and Cryo-SEM", Liang, et al., J. Phys. Chem. B (2001) 105, pp. 9653-9662.

* cited by examiner

*Primary Examiner* — Basia Ridley
*Assistant Examiner* — Alexander C Kollias
(74) *Attorney, Agent, or Firm* — Lisa P. Fulton

(57) ABSTRACT

An adhesive composition includes 5 to 40% wt polyvinylpyrrolidone; 3 to 20% wt alkanoate blend including a first $C_n$ carboxylic acid salt and a second $C_m$ carboxylic acid salt, where n and m are integers in a range from 12 to 22; 20 to 60% wt of a water-soluble or water-dispersable solid material; 0.5 to 30 wt % of a liquid polyhydric alcohol; and 15 to 60% wt water. The adhesive composition can be clear and in glue stick form.

9 Claims, No Drawings

ADHESIVE WITH ALKANOATE BLEND

BACKGROUND

The present disclosure relates to adhesives that include an alkanoate blend. More specifically the present disclosure relates to adhesives that provide long-lasting initial tack, long open times, reduced substrate wrinkling, improved clarity, and/or reduced clumping.

Adhesives are known for the bonding of paper substrates, including self-supporting solid adhesives as well as flowing liquid adhesives. Aqueous solid adhesives that include a fatty acid salt offer smooth, even application and good adhesive properties on paper, as disclosed in U.S. Pat. Nos. 3,576,776 and 6,066,689. Use of these soap-gel based adhesives ("glue sticks") has required quick closure of the bonding surfaces immediately after applying the adhesive. Quick bond closure is necessary because of the low initial adhesive tack which decreases rapidly as the aqueous solvent evaporates. Moreover, despite apparent claims to the contrary on commercial products, glue sticks have a tendency to noticeably wrinkle paper substrates.

Liquid adhesives which bond paper are numerous. For consumer use, the body of products containing an aqueous or water-miscible solvent is especially attractive because of their decreased toxicity relative to volatile, water-immiscible solvents. Frequently used adhesive polymers for aqueous consumer adhesives include polyvinylalcohol (PVOH), polyvinylpyrrolidone (PVP), starches, poly(2-ethyl-2-oxazoline), cellulose, their copolymers and their derivatives.

The aqueous liquid and solid adhesives mentioned above suffer from one or more of the following drawbacks: clumping; significant paper wrinkling; quickly deteriorating wet tack during application, short open times, temporary paper bonds.

SUMMARY

The present disclosure relates to adhesives that include an alkanoate blend. More specifically the present disclosure relates to adhesives that provide increased wet tack, long open times, reduced substrate wrinkling, improved clarity, and/or reduced clumping as compared to adhesives, such as to glue sticks, that are commercially available.

One aspect relates to an adhesive composition that includes 5 to 40% wt polyvinylpyrrolidone, 3 to 20% wt alkanoate blend of a first $C_n$ carboxylic acid salt and a second $C_m$ carboxylic acid salt, where n and m are integers in a range from 12 to 22, 20 to 60% wt of a water-soluble or water-dispersable material, 0.5 to 30 wt % of a liquid polyhydric alcohol, and 15 to 60% wt water.

Another aspect relates to a clear adhesive composition that includes 5 to 40% wt polyvinylpyrrolidone, 3 to 20% wt alkanoate blend of a first $C_n$ carboxylic acid salt and a second $C_m$ carboxylic acid salt, where n and m are integers in a range from 12 to 22, 20 to 60% wt of a water-soluble or water-dispersable material, 0.5 to 30 wt % of a liquid polyhydric alcohol, and 15 to 60% wt water. The clear adhesive composition has a visible wavelength light transmission in a range from 90% to 100%.

A further aspect relates to a glue stick including 5 to 40% wt polyvinylpyrrolidone, 3 to 20% wt alkanoate blend of a first $C_n$ carboxylic acid salt and a second $C_m$ carboxylic acid salt, where n and m are integers in a range from 12 to 22, 20 to 60% wt of a water-soluble or water-dispersable material, 0.5 to 30 wt % of a liquid polyhydric alcohol, and 15 to 60% wt water.

In many embodiments, the total of the solid material, liquid polyhydric alcohol, and any other water-miscible solvent concentrations is at least 50% of the total water content of the adhesive composition.

The above summary is not intended to describe each disclosed embodiment or every implementation of the present disclosure. The Detailed Description and Examples that follow more particularly exemplify these embodiments.

DETAILED DESCRIPTION

The present disclosure relates to adhesives that include an alkanoate blend. More specifically the present disclosure relates to adhesives that provide increased wet tack, long open times, reduced substrate wrinkling, improved clarity, and/or reduced clumping.

For the following defined terms, these definitions shall be applied, unless a different definition is given in the claims or elsewhere in this specification.

Weight percent, percent by weight, % by weight, % wt, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a solid material" includes of two or more solid materials. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The present disclosure describes adhesives that can provide decreased wrinkling when applied to paper substrates, increased wet tack, long open times, reduced substrate wrinkling, improved clarity, and/or reduced clumping. The disclosed formulations can allow for a longer period of time between adhesive application and substrate bonding, yet produce fiber tearing bonds instead of temporary adhesion. These attributes can be desirable for easy, permanent paper bonding and attractively bonded craft projects. These adhesives may also be useful for bonding non-paper substrates.

Increased wet-tack is achieved through use of any of a number of water-soluble or water-dispersible solids, among which water-soluble carbohydrates such as sucrose, carboxymethylcellulose, or starch and starch derivatives are preferred. While not wishing to be bound by any particular theory, we believe the water-dispersible or water-soluble solids serve as tackifiers by increasing the elastic modulus of inventive adhesive compositions at high deformation rates, while decreasing the elastic modulus at lower deformation rates. These supposed changes in rheological behavior are in accord with an increase in the glass transition temperature and a decrease in the plateau modulus of a pressure-sensitive adhesive.

Given an aqueous adhesive composition, one method of increasing the "open time", i.e., the period over which the adhesive is aggressively tacky and a successful bond can be made, is to simply increase the amount of water present in the adhesive. However, this adversely increases paper wrinkling as the adhesive material dries and shrinks. For glue sticks, shrinkage due to evaporation is especially undesirable during consumer storage. In such cases, the result is a visibly deformed product which, although perhaps functional as an adhesive, is more difficult to apply and aesthetically unappealing.

Another approach to improving open time is found in 3M's "restickable" glue stick (U.S. Pat. No. 5,409,977), which includes an inherently tacky microsphere adhesive. After being applied and allowed to dry without bonding, this adhesive has sufficient tack to lightly bond substrates. However, this method of increasing open time may not be effective if permanent bonds are desired.

Improved open time is accomplished in the present invention through combined use of a water-soluble or water-dispersible solid material such as sucrose, and liquid polyhydric alcohol such as 1,2 butanediol. While the sucrose effectively increases adhesive wet tack, we have found that using both sucrose and liquid polyhydric alcohols promotes both high wet tack and long open times.

Given an aqueous adhesive composition, one method of decreasing wrinkling during drying is to simply increase the adhesive polymer concentration and reduce the solvent concentration. This results in less wrinkling and a smaller volume change as the solvent evaporates, as well as a shorter drying time. However, this approach also tends to result in increased viscosity and manufacturing costs, and it can lead to a more messy product use.

Another method of decreasing wrinkling during drying is to exchange water for less volatile solvents such as $C_3$ and $C_4$ glycols and other water-miscible solvents. This approach also enhances the lubricity of glue sticks to impart a smooth, gliding application. Using a water-miscible, slowly evaporating solvent allows for improved stress relaxation during the drying process, such that less wrinkling occurs while the adhesive shrinks. However, this approach can dramatically reduce adhesive tack while simultaneously slowing the drying process. As a result bonded materials may need to be held in place or set aside for a lengthy period prior to use or display.

Adhesives described herein provide higher wet tack, longer-lasting tack (i.e., improved open time) and reduced paper wrinkling without the drawbacks associated with methods described above. In particular, combined use of a water-soluble or water-dispersible solid with a polyhydric alcohol promotes strong initial tack, long open times and reduced substrate wrinkling. The adhesives offer immediate adhesion to articles without undesirable pop-off or peeling and provide permanent, low-wrinkle bonds as the adhesive dries. By adjusting the adhesive composition, the adhesive may also be produced as a self-supporting glue stick, as described below.

The adhesive composition includes a water soluble adhesive resin or polymer. In many embodiments, the water soluble adhesive resin or polymer includes a polyvinylpyrrolidone (PVP), a polyvinyl alcohol (PVOH), poly(2)ethyl-2-oxazoline, water soluble starches, water soluble starch derivatives, and/or cellulose derivatives. Although PVP is exemplified throughout this specification, any one or more of the water soluble adhesive resins or polymers can be utilized in addition to PVP or to replace PVP.

The adhesive composition includes polyvinylpyrrolidone, an alkanoate blend of a first $C_n$ carboxylic acid salt and a second $C_m$ carboxylic acid salt, where n and m are integers in a range from 12 to 22, water, liquid polyhydric alcohol, and water-soluble or water-dispersible solids. In some embodiments, the adhesive composition can be clear and in glue stick form.

In many embodiments, the adhesive composition includes 5 to 40% wt polyvinylpyrrolidone, 3 to 20% wt alkanoate blend of a first $C_n$ carboxylic acid salt and a second $C_m$ carboxylic acid salt, where n and m are integers in a range from 12 to 22, liquid polyhydric alcohol, water-soluble or water-dispersible solids, and 15 to 60% wt water.

The alkanoate blend includes a mixture of at least two carboxylate salts having 12 to 22 carbon atoms and be either branched or straight chain, and may have one or more double bonds or one or more substituents such as, for example, a halogen. The alkanoate blend can be used to improve many features of the adhesive, whether to produce a liquid form with reduced sagging, or to produce a stick product having enhanced translucence and/or smoother application, for example. When the adhesive is in the form of a glue stick it is desirable that the adhesive apply to an adherend in a smooth even layer. If the stick is not sufficiently firm, the adhesive fractures or breaks during application resulting in deposition of pieces of adhesive, i.e., "clumps" on the adherend rather than a smooth continuous adhesive film. This fracture and accompanying deposition of adhesive pieces during application is referred to as "clumping".

While not wishing to be bound by any particular theory, we believe the enhanced translucence and reduced clumping of the inventive adhesive materials containing an alkanoate blend results from accessing soap gel microstructures that feature amorphous association of hydrocarbon chains. Additionally, it has been found that introducing certain solid or liquid adjuvants to the adhesive having refractive indices complimentary to the soap gel microstucture can further improve glue stick translucency. These adjuvants may include polyhydric alcohols such as sucrose, aliphatic glycols, etc.

Thus, adhesive compositions of the instant invention contain (1) alkanoate blends, which hinder ordering of aliphatic groups in the soap gel microstructure, and in some cases (2) solid materials having a refractive index sufficiently high to convey enhanced translucency to the adhesive composition. Additionally these solid materials may also impart enhanced tack and reduced wrinkling.

The alkanoate blend can be a salt derivative such as, for example, alkali metal, group II metal, group III metal, ammonium, and lower alkyl ($C_1$-$C_4$) ammonium salts of carboxylic acids. In many embodiments, the alkanoate blend includes $C_{12}$ to $C_{22}$ carboxylic acid sodium salts such as sodium stearate, sodium oleate, sodium palmitate, sodium myristate, and sodium laurate which can yield particularly favorable results.

The first and second carboxylic acid salts can be in the alkanoate blend in any useful amounts. In many embodiments, the alkanoate blend is 5 to 95 wt % first $C_n$ carboxylic acid salt based on total weight of alkanoate blend and 95 to 5 wt % second $C_m$ carboxylic acid salt based on total alkanoate blend, where n and m are integers in a range from 12 to 18. In many embodiments, the alkanoate blend is 10 to 90 wt % first $C_n$ carboxylic acid salt based on total weight of alkanoate blend and 90 to 10 wt % second $C_m$ carboxylic acid salt based on total alkanoate blend, where n and m are integers in a range from 12 to 18. In some embodiments, the first and second carboxylic acid salts are each present in the alkanoate blend in a range from 30 to 70% wt, based on the total weight of alkanoate blend. In some embodiments, the first and second carboxylic acid salts are each present in the alkanoate blend in a range from 40 to 60% wt, based on the total weight of alkanoate blend. In one embodiment, the first and second carboxylic acid salts are each present in the alkanoate blend in equal weight amounts. In illustrative embodiments, the first carboxylic acid salt and the second carboxylic acid salt have carbon chain lengths that differ in length by two carbon atoms.

In some embodiments, the first $C_n$ carboxylic acid salt is a $C_{12}$ carboxylic acid salt (e.g., laurate salt) and the second $C_m$ carboxylic acid salt is a $C_{14}$ carboxylic acid salt (e.g., myristate salt). In some embodiments, the first $C_n$ carboxylic acid salt is a $C_{14}$ carboxylic acid salt (e.g., myristate salt) and the second $C_m$ carboxylic acid salt is a $C_{16}$ carboxylic acid salt (e.g., palmitate salt). In other embodiments, the first $C_n$ carboxylic acid salt is a $C_{16}$ carboxylic acid salt (e.g., palmitate salt) and the second $C_m$ carboxylic acid salt is a $C_{18}$ carboxylic acid salt (e.g., stearate salt).

In some embodiments, the alkanoate blend is a first $C_n$ carboxylic acid salt, a second $C_m$ carboxylic acid salt, and a third $C_b$ carboxylic acid salt, where n, m and b are integers in a range from 12 to 22. The first, second and third carboxylic acid salts can be in the alkanoate blend in any useful amounts. In some embodiments, the first, second and third carboxylic acid salts are each present in the alkanoate blend in a range from 20 to 40% wt, based on the total weight of alkanoate blend. In one embodiment, the first, second and third carboxylic acid salts are each present in the alkanoate blend in equal weight amounts.

In some embodiments, the first $C_n$ carboxylic acid salt is a $C_{12}$ carboxylic acid salt (e.g., laurate salt), the second $C_m$ carboxylic acid salt is a $C_{14}$ carboxylic acid salt (e.g., myristate salt), and the third $C_b$ carboxylic acid salt is a $C_{16}$ carboxylic acid salt (e.g., palmitate salt). In some embodiments, the first $C_n$ carboxylic acid salt is a $C_{14}$ carboxylic acid salt (e.g., myristate salt), the second $C_m$ carboxylic acid salt is a $C_{16}$ carboxylic acid salt (e.g., palmitate salt), and the third $C_b$ carboxylic acid salt is a $C_{18}$ carboxylic acid salt (e.g., stearate salt). In other embodiments, the first $C_n$ carboxylic acid salt is a $C_{16}$ carboxylic acid salt (e.g., palmitate salt), the second $C_m$ carboxylic acid salt is a $C_{18}$ carboxylic acid salt (e.g., stearate salt), and the third $C_b$ carboxylic acid salt is a $C_{20}$ carboxylic acid salt (e.g., arachidate salt).

The adhesives include water, liquid polyhydric alcohols, and optionally other water-miscible organic solvents in which the alkanoate blend, polyvinylpyrrolidone, and any other solid materials are dissolved/suspended. Among liquid polyhydric alcohols, any carbohydrate having fewer than about 6 carbon atoms and a melting point below about 70° F. may be used. Example liquid polyhydric alcohols include ethylene glycol, propylene glycol, butylene glycol, and di- and triethylene glycol, glycerine and diglycerine. In many embodiments, liquid polyhydric alcohols are present in the adhesive in a range of 0.5 to 30% wt or 5 to 20% wt, and water is present in the adhesive in a range of 15 to 60% wt or 20 to 50% wt.

Other water misible organic solvents may optionally be used in the adhesive compositions. Examples include methanol, ethanol, and isopropanol; amyl alcohols, furfuryl alcohol, and benzyl alcohol as well as dioxane, acetonitrile, tetrahydrofuran, dimethylformamide or dimethylsulfoxide can also be useful in small amounts. Moreover, acetone and methylethylketone can also be suitable. Further, as water-miscible organic solvents, plasticizers and/or moisture retainers such as for instance, tetraethyleneglycol, and lower molecular weight polyethylene glycols can be employed. These auxiliary water-miscible organic solvents should constitute 20% or less of the total adhesive composition.

A water soluble or water-dispersible solid material is included in the adhesives described herein. These water soluble or water-dispersible solid materials can increase adhesive setting time and decrease bond strength at low deformation rates. The one or more water-soluble or water dispersible solid materials increase the solid content of the adhesive compositions and serve as a tackifier for the adhesive polymer. These materials can be chosen in such a manner that the final adhesive product has lasting initial tack, low wrinkling tendency, acceptably swift setting speed, and improved clarity. In many embodiments, these solid materials are either crystalline materials with a melting point above 70° F. (21° C.), or viscoelastic fluids having a complex shear modulus above about 200 Pa when measured at 70° F. (21° C.) and a frequency of 1 rad/s.

Water soluble or water-dispersible solid material can be dissolved or dispersed in submicron particle sizes in water at significant concentrations (e.g., up to 10% by weight or higher). In many embodiments, water soluble or water-dispersible solid materials are compounds which significantly increase the solids concentration of the aqueous phase while minimally increasing its viscosity. Further, the solid content of the adhesive composition should allow for reasonably rapid solvent evaporation as the adhesive sets.

In many embodiments, water soluble or water-dispersible solid material include crystalline sugars such as fructose, glucose, sucrose, sorbitol, mannitol, and xylitol, as well as their water-compatible esters. In addition, polymers of any molecular weight may also be used. In some embodiments, these polymers include polyesters, polyethers, polyacrylates, gelatin, polyacrylamides, their copolymers and their derivatives. Inorganic materials such as fumed silica, colloidal silica, and alkali-halide salts may also be employed as water soluble or water-dispersible solid materials. The array of materials which may be used as water-soluble or water-dispersible solids is broad and intended to be understood as such. In many embodiments, the solid materials should be greater than about 19 to 20%, and less than about 60% to 50% by weight of the total adhesive composition. In some embodiments, the solid material is present in the adhesive composition in a range from 20 to 60%, or 20 to 50%, or 30 to 50% by weight of the total adhesive composition. In many embodiments, the ratio of the solid material to the adhesive polymer concentration (PVP) is between about 0.2:1.0 and about 11.0:1.0. Further, in many embodiments the total of the solid material, liquid polyhydric alcohol, and other water-miscible solvent concentrations is at least 50% of the total water content of the adhesive composition.

In some embodiments, a clear adhesive composition includes 5 to 40% wt polyvinylpyrrolidone, 3 to 20% wt alkanoate blend of a first $C_n$ carboxylic acid salt and a second $C_m$ carboxylic acid salt, where n and m are integers in a range from 12 to 22, 20 to 60% wt water soluble or water-dispersible solid material, 0.5 to 30% wt liquid polyhydric alcohol, and 15 to 60% wt water. These clear adhesive compositions can have a visible wavelength light transmission in a range from 85% to 100% or from 90% to 100% at a selected visible light wavelength.

It is envisioned that the adhesive compositions of the present invention may also contain minor amounts of dyestuffs as well as pigments and decorative materials. They may contain odor improving compounds such as pine-needle oil, eucalyptus oil, anise seed oil, benzaldehyde and the like. Optionally, other additives may be added in minor amounts of less than about 10% to improve performance, stability, microbial resistance, appearance, pH control and other attributes.

The adhesive compositions can have any useful pH value. In many embodiments, the adhesive composition has a pH value in a range from 6 to 11, or 6 to 9, or 6 to 7.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Test Methods

Adhesive Clarity Test

Visible wavelength light transmission measurement values are obtained through adhesive samples having a thickness of 0.125 mm pressed between 1 mm thick glass slides and at 21 degrees centigrade, using a spectrophotometer to record transmittance between 190 and 820 nm wavelengths, with a wavelength resolution of 2 nm.

Adhesive Clumping Test

Each adhesive was assigned a rating based on the amount of clumping occurring during application to paper. A common glue stick container with a rotary base was used to apply the adhesive with modest hand pressure. Prior to applying the adhesive, a razor blade was used to slice away the open end of the adhesive sample, leaving a flat adhesive surface. Samples which demonstrated an appreciable tendency to deposit fractured clumps of adhesive gel during use were rated "poor," while samples which did not tend to deposit clumps were rated "good."

Adhesive Wrinkling Test

Each adhesive was assigned a wrinkling rating based on the amount of wrinkling caused when two sheets of plain 20 lb. copier paper were adhered together. Distinctions between the ratings "good," and "poor" are readily noticeable to the unaided eye.

Adhesive Tack Test

This test provides a means of determining the tack exhibited by adhesives immediately after applying to a sheet of paper.

Adhesive is applied to a paper strip by mounting a gluestick in a fixture on an Instrumentors, Inc., Model 3M90 Slip/Peel Tester, and operating the peel tester to convey the paper strip past the gluestick. The adhesive-coated paper strip is then contacted with a cylindrical mandrel, the mandrel is elevated and the length of time the paper remains adhered to the mandrel recorded.

More specifically, an adhesive stick is mounted in a vertical orientation with the adhesive end of the stick oriented downward in an annular mounting fixture such that the adhesive end of the stick rests on a 3.8 cm×28 cm strip of copy paper (Hammermill Copy Plus 20 lb, 84 brightness) that has been affixed to the tester platen with a strip of Scotch 811 Removable Magic Tape. A 0.68 kg annular weight is placed atop the annular mounting fixture securing the adhesive stick, and the peel tester is operated at a speed of 229 cm/minute to convey the paper strip beneath the adhesive stick, thereby applying a continuous streak of adhesive to the paper strip. This operation is repeated a second time on the same sheet of paper to provide more complete adhesive coverage. Immediately following the second adhesive application, the tape strip adhering the paper to the platen is removed and an aluminum cylinder measuring 12.8 mm dia×55.5 mm length and having a weight of 19.4 g is placed on the adhesive stripe about 7 cm from the end of the paper strip and allowed to dwell for 2 seconds before the cylindrical weight is lifted normal to the platen at a rate of 305 cm/minute a total distance of 38 cm. The cylindrical element is maintained in this position a maximum time of 300 seconds or until the paper strip falls off the cylinder. The time at which the paper falls is noted and recorded. The test is repeated in its entirety 2 more times and the 3 values obtained averaged together and recorded as the Average Tack Time. Samples with insufficient tack to completely lift the paper strip were recorded as having zero tack time.

Adhesive Open Time

This test provides a means of assessing the open time of an adhesive, i.e., the period over which the adhesive is aggressively tacky and a successful bond can be made. To perform this test, an adhesive is applied to paper and five minutes are allowed to elapse prior to laminating with a second sheet of paper. If a fiber-tearing bond was formed within five minutes after the second sheet is laminated, the adhesive was said to have an open time of at least five minutes.

More specifically, a strip of plain 20 lb. copier paper was coated twice with adhesive as described in the "adhesive tack test" above. After five minutes of exposure to ambient conditions (21° C., 50% relative humidity), a second strip of plain copier paper was laminated to the coated piece of paper using two gentle passes with a 2.8 kg roller. After five additional minutes of exposure to ambient conditions, the pieces of paper were delaminated swiftly by hand. If a fiber-tearing bond had formed between the paper strips, the adhesive was said to have an open time of more than five minutes. If no fiber-tearing bond was produced, the adhesive was said to have an open time of less than 5 minutes.

Sample Preparation

Each of the illustrative examples was prepared in a 1000 mL resin flask equipped with a stirring motor and heated bath. Samples were heated to temperatures of 60° to 80° C. After a homogenous mixture was formed, bubbles were removed by applying aspirator vacuum for a period of 30 to 60 seconds and the resulting sample was poured into a container and allowed to cool before use. In each of the examples below, the mold used for cooling was a common glue stick container, having an inside diameter of approximately 16 mm, with a rotary base driving a screw type advancing mechanism. Comparative product samples were used as provided.

Adhesive Compositions

The adhesive compositions (weight %) are described in Table Ia, Table Ib, and Table Ic below:

TABLE Ia

|  | 1 | 2 | 3 | 4 | 5 | 6 |
|---|---|---|---|---|---|---|
| Total water | 15.0% | 60.0% | 38.5% | 36.8% | 38.0% | 33.0% |
| PVP K90 | 0.0% | 15.0% | 5.0% | 0.0% | 15.0% | 11.0% |
| PVP K30 | 15.0% | 0.0% | 0.0% | 39.8% | 0.0% | 0.0% |
| PVOH 51-05 | 0.0% | 0.0% | 0.0% | 0.0% | 0.0% | 0.0% |
| Sucrose | 20.0% | 20.0% | 50.0% | 19.9% | 20.0% | 40.0% |
| D-sorbitol | 0.0% | 0.0% | 0.0% | 0.0% | 0.0% | 0.0% |
| 1,2-butanediol | 0.0% | 0.0% | 0.0% | 0.5% | 10.0% | 5.0% |
| 1,2-propanediol | 30.0% | 2.0% | 0.5% | 0.0% | 10.0% | 5.0% |
| sodium myristate | 10.0% | 1.5% | 3.0% | 1.5% | 2.3% | 5.7% |
| sodium palmitate | 10.0% | 1.5% | 3.0% | 1.5% | 2.3% | 0.3% |
| Sodium Stearate | 0.0% | 0.0% | 0.0% | 0.0% | 2.3% | 0.0% |

TABLE Ib

|  | 7 | 8 | 9 | 10 |
|---|---|---|---|---|
| Total water | 58.9% | 48.0% | 33.0% | 33.0% |
| PVP K90 | 0.0% | 11.0% | 10.0% | 11.0% |
| PVP K30 | 0.0% | 0.0% | 0.0% | 0.0% |
| PVOH 51-05 | 11.1% | 0.0% | 0.0% | 0.0% |
| Sucrose | 22.2% | 0.0% | 41.0% | 40.0% |
| D-sorbitol | 0.0% | 30.0% | 0.0% | 0.0% |
| 1,2-butanediol | 1.1% | 5.0% | 5.0% | 5.0% |
| 1,2-propanediol | 0.0% | 0.0% | 5.0% | 5.0% |
| sodium myristate | 3.3% | 3.0% | 3.0% | 5.4% |
| sodium palmitate | 3.3% | 3.0% | 3.0% | 0.6% |
| Sodium Stearate | 0.0% | 0.0% | 0.0% | 0.0% |

TABLE Ic

|  | C1 | C2 | C3 | C4 |
|---|---|---|---|---|
| Total water | 43.0% | 73.0% | 33.0% | 83.0% |
| PVP K90 | 11.0% | 11.0% | 11.0% | 11.0% |
| PVP K30 | 0.0% | 0.0% | 0.0% | 0.0% |
| PVOH 51-05 | 0.0% | 0.0% | 0.0% | 0.0% |
| Sucrose | 40.0% | 0.0% | 40.0% | 0.0% |
| D-sorbitol | 0.0% | 0.0% | 0.0% | 0.0% |
| 1,2-butanediol | 0.0% | 5.0% | 5.0% | 0.0% |
| 1,2-propanediol | 0.0% | 5.0% | 5.0% | 0.0% |
| sodium myristate | 3.0% | 3.0% | 6.0% | 0.0% |
| sodium palmitate | 3.0% | 3.0% | 0.0% | 0.0% |
| Sodium Stearate | 0.0% | 0.0% | 0.0% | 6.0% |

PVP K90 and K30 refers to polyvinylpyrrolidone and is available from BASF Corporation, Mount Olive, N.J., or from International Specialty Products GAF Corporation, Wayne, N.J., USA.

PVOH 51-05 refers to Elvanol 51-05 partially hydrolyzed polyvinylalcohol available from Dupont Corporation, Wilmington, Del., USA Surcose is available from Aldrich Corporation, St. Louis, Mo., USA 1,2-butanediol is available from Aldrich Corporation, St. Louis, Mo., USA 1,2-propanediol is available from Aldrich Corporation, St. Louis, Mo., USA Sodium myristate is available from Viva Corporation, Mumbai, India Sodium palmitate is available from Viva Corporation, Mumbai, India Sodium stearate is available from Viva Corporation, Mumbai, India D-sorbitol is available from Aldrich Corporation, St. Louis, Mo., USA Testing Results Testing results of the Examples and comparative commercial adhesives are listed in Table II below.

TABLE II

| Example | Gelling agent blend ratio (C14:C16:C18) | $T_{650\,nm}$ (%) | Clumping | Open Time | Tack hold time (sec) | Wrinkling performance |
|---|---|---|---|---|---|---|
| 1 | 1:1:0 | 33% | poor | less than 5 min. | 0.0 | Good |
| 2 | 1:1:0 | 96% | good | less than 5 min. | 22.7 | Poor |
| 3 | 1:1:0 | 84% | good | less than 5 min. | 0.0 | Good |
| 4 | 1:1:0 | 85% | poor | too soft | too soft | Poor |
| 5 | 1:1:1 | 100% | good | more than 5 min. | 20.3 | Poor |
| 6 | 95:5:0 | 84% | good | more than 5 min. | 76.7 | Good |
| 7 | 1:1:0 | 17% | poor | too soft | too soft | Poor |
| 8 | 1:1:0 | 100% | good | less than 5 min. | 0.0 | Poor |
| 9 | 1:1:0 | 100% | good | more than 5 min. | 11.7 | Good |
| 10 | 90:10:0 | 92% | good | more than 5 min. | 47.3 | Good |
| C1 | 1:1:0 | Produced foam during mixing - did not test | | | | |
| C2 | 1:1:0 | 88% | good | less than 5 min. | 0.0 | Poor |
| C3 | 1:0:0 | 83% | good | more than 5 min. | 143.3 | Good |
| C4 | 0:0:1 | 25% | poor | less than 5 min. | 0.0 | Poor |
| 3M Scotch ™ | — | 33% | poor | less than 5 min. | 3 | Poor |

TABLE II-continued

| Example | Gelling agent blend ratio (C14:C16:C18) | $T_{650\,nm}$ (%) | Clumping | Open Time | Tack hold time (sec) | Wrinkling performance |
|---|---|---|---|---|---|---|
| Glue Stick Elmer's all Purpose glue stick | — | 32% | poor | less than 5 min. | 5 | Poor |
| Elmer's School Glue Gel Glue Stick | — | 19% | poor | less than 5 min. | 5 | Poor |
| UHU™ stic | — | 63% | poor | less than 5 min. | 4 | Poor |

3M Scotch® Glue Stick is available from 3M, St. Paul, Minn. Elmer's All-Purpose and School Glue Gel Glue Sticks are available from Elmer's Products, Inc., Columbus, Ohio. UHU™ stic is available from Saunders, Winthrop, Me.

All of the Examples and commercial adhesives can produce permanent, fiber-tearing paper bonds. However, the Examples are distinct in offering increased wet tack, long open times, reduced substrate wrinkling, improved clarity, and/or reduced clumping. For instance, although comparative example C3 affords long open times, reduced substrate wrinkling, and reduced clumping, the lack of a blended gelling agent minimizes clarity. In examples 6, 10, and 9, respectively, the increasing ratio of $C_{16}$ to $C_{14}$ sodium alkanoates appears responsible for improved clarity in the otherwise similar adhesives. Likewise, comparative example C2 has reduced clumping but poor wrinkling performance, low tack hold time, and an open time of less than 5 minutes. Example 9 (also see examples 6 & 10) has reduced wrinkling, higher tack hold time, and an open time of longer than 5 minutes, primarily because sucrose is incorporated in the composition at 40 wt %.

The present invention has been described with reference to several embodiments thereof. The foregoing detailed description and examples have been provided for clarity of understanding only, and no unnecessary limitations are to be understood therefrom. It will be apparent to those skilled in the art that many changes can be made to the described embodiments without departing from the spirit and scope of the invention. Thus, the scope of the invention should not be limited to the exact details of the compositions and structures described herein, but rather by the language of the claims that follow. In case of any conflict, the present specification, including definitions, shall control.

What is claimed is:

1. A glue stick consisting essentially of:
   5 to 40% wt polyvinylpyrrolidone;
   3 to 20% wt alkanoate blend comprising a first $C_n$ carboxylic acid salt and a second $C_m$ carboxylic acid salt, where n and m are different integers in a range from 12 to 22;
   20 to 50% wt water soluble or water-dispersible solid material wherein the water-soluble or water dispersible solid material is sugar;
   0.5 to 30% wt of a liquid polyhydric alcohol; and
   15 to 60% wt water;
   wherein the total weight of the water-soluble or water-dispersible solid material and the liquid polyhydric alcohol is greater than 50% of the weight of the water and the adhesive composition has a visible wavelength light transmission in a range from 90% to 100%.

2. An adhesive composition consisting essentially of:
   5 to 40% wt polyvinylpyrrolidone;
   3 to 20% wt alkanoate blend comprising a first $C_n$ carboxylic acid salt and a second $C_m$ carboxylic acid salt, where n and m are different integers in a range from 12 to 22;
   20 to 50% wt of a water-soluble or water-dispersible solid material wherein the water-soluble or water dispersible solid material is sugar;
   0.5 to 30% wt of a liquid polyhydric alcohol;
   15 to 60% wt water; and
   wherein the total weight of the water-soluble or water-dispersible solid material and the liquid polyhydric alcohol is greater than 50% of the weight of the water and the adhesive composition has a visible wavelength light transmission in a range from 90% to 100%.

3. The adhesive composition according to claim 2 wherein the adhesive composition further consisting essentially of 5 to 20% wt of said liquid polyhydric alcohol.

4. The adhesive composition according to claim 2 wherein the alkanoate blend comprises 5 to 95% wt of the first $C_n$ carboxylic acid salt based on total weight of alkanoate blend and 95 to 5% wt of the second $C_m$ carboxylic acid salt based on total alkanoate blend, where n and m are integers in a range from 12 to 18.

5. The adhesive composition according to claim 2 wherein the alkanoate blend comprises the first $C_n$ carboxylic acid salt, the second $C_m$ carboxylic acid salt, and a third $C_b$ carboxylic acid salt, where n, m and b are different integers in a range from 12 to 22.

6. The adhesive composition according to claim 2 wherein the alkanoate blend comprises 5 to 95% wt myristate salt based on total weight of alkanoate blend and 95 to 5% wt palmitate salt based on total alkanoate blend.

7. The adhesive composition according to claim 2 wherein the alkanoate blend comprises 5 to 95% wt palmitate salt based on total weight of alkanoate blend and 95 to 5% wt stearate salt based on total alkanoate blend.

8. The adhesive composition according to claim 2 wherein the alkanoate blend comprises 5 to 95% wt laurate salt based on total weight of alkanoate blend and 95 to 5% wt myristate salt based on total alkanoate blend.

9. The adhesive composition according to claim 2, wherein the liquid polyhydric alcohol is one or more selected from the group consisting of 1,2-butanediol and 1,2-propanediol.

* * * * *